July 26, 1932.   H. W. BUCK   1,869,046
CAR PUSHER AND TRANSFER
Filed Feb. 23, 1932   4 Sheets-Sheet 1
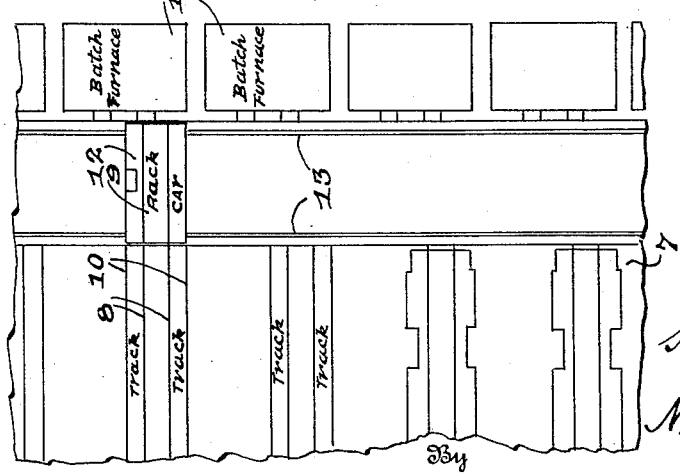

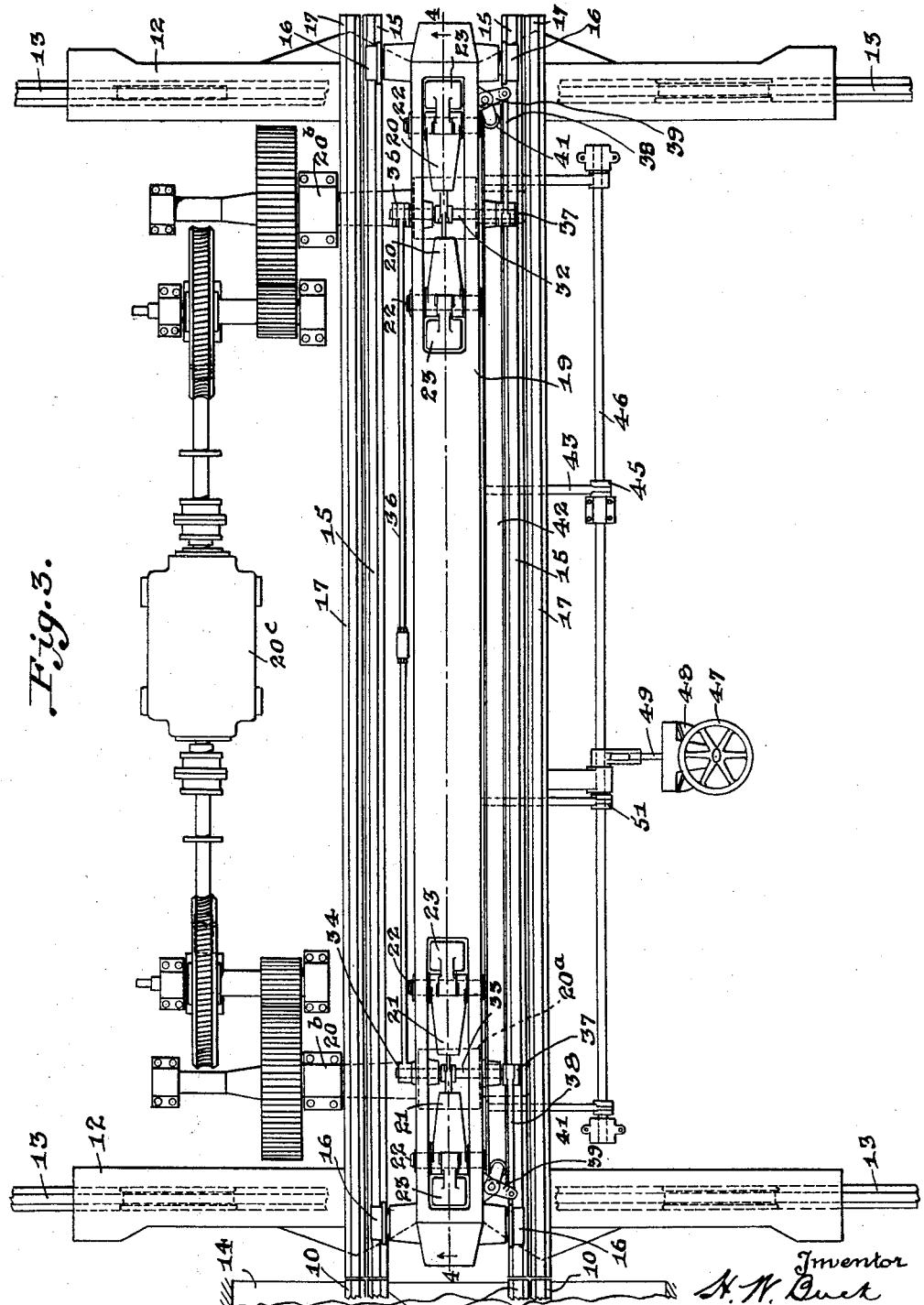

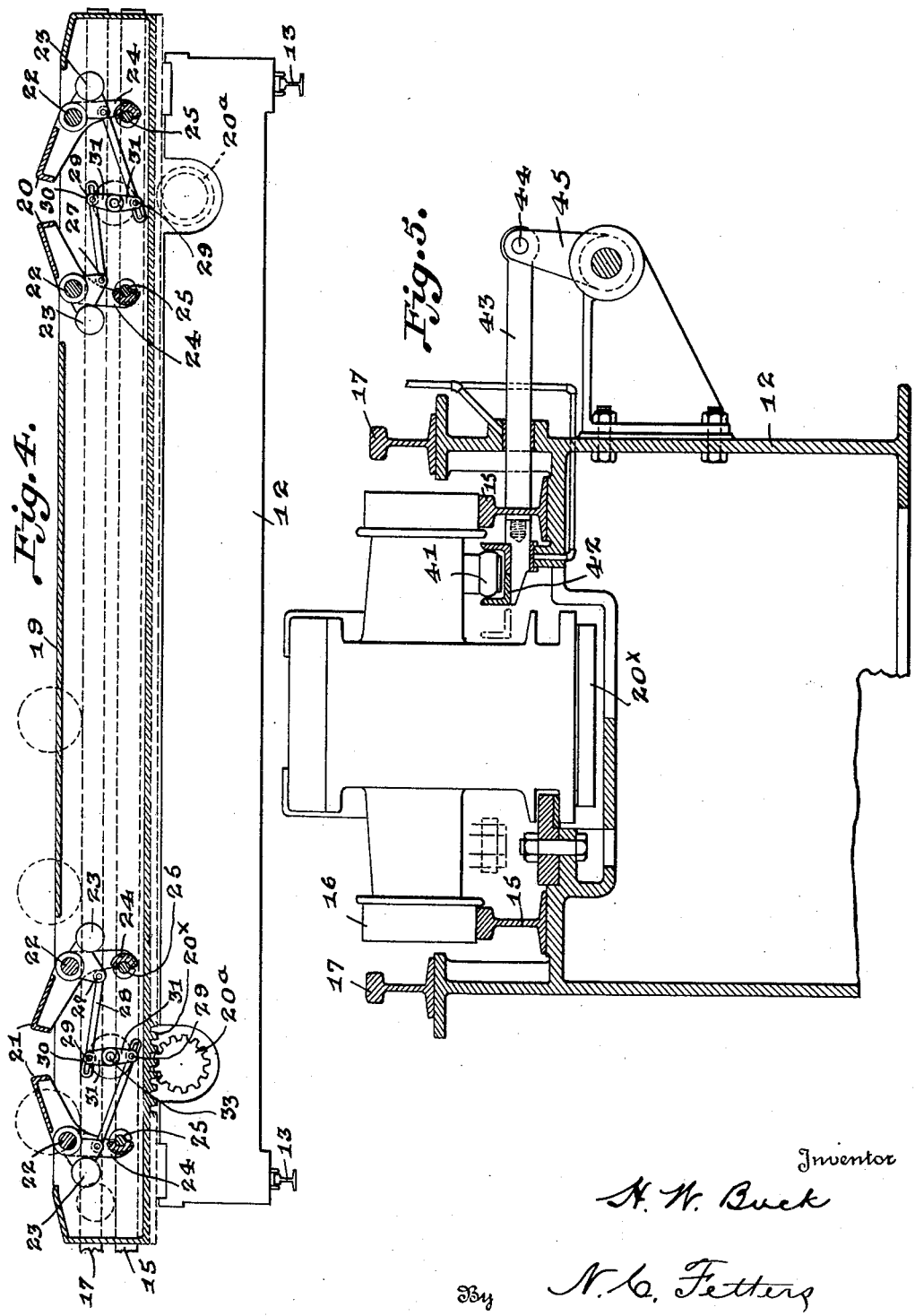

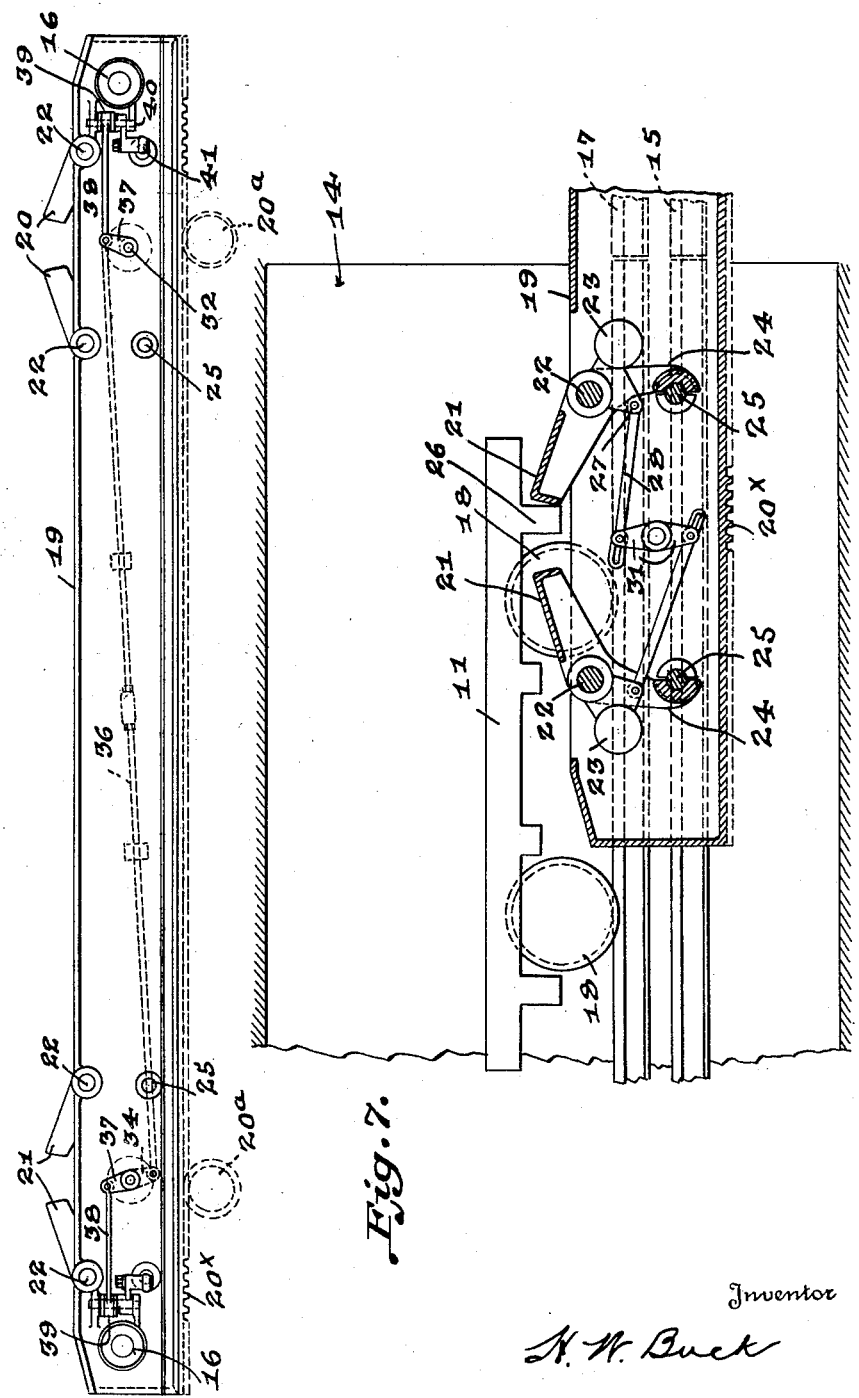

Patented July 26, 1932

1,869,046

UNITED STATES PATENT OFFICE

HOMER W. BUCK, OF ALLIANCE, OHIO, ASSIGNOR TO THE MORGAN ENGINEERING COMPANY, OF ALLIANCE, OHIO, A CORPORATION

CAR PUSHER AND TRANSFER

Application filed February 23, 1932. Serial No. 594,757.

This invention relates to improvements in a car pusher and transfer, and while the mechanism has been designed for use in placing cars in and withdrawing them from continuous annealing furnaces, it will be apparent to those skilled in the art, the improved device can be employed for shifting or reciprocating various types of cars from either side of the transfer mechanism to the other side of such transfer mechanism.

In accordance with the present invention, the loading yard, continuous furnaces, batch furnaces, or return tracks are all equipped with main rails forming tracks of the same gauge and elevation as similar rails mounted on top of the transfer car, which itself runs on rails at right angles to these and located in a transfer pit of depth to suit the height of the transfer car.

A second pair of rails on the transfer car, inside of and at a slightly lower elevation than the first mentioned rails of that car support a rack car. At each loading station, furnace or return track a similar pair of auxiliary rails is provided between the main rails and extending far enough to accommodate the movement of the rack car, which may be locked in proper position to match the rails at any of these stations.

The primary object of the invention is to combine with the transfer car, novel means for releasing car engaging dogs, when the car pusher or puller in any position in its range of travel.

With the foregoing object outlined and with other objects in view which will appear as the description proceeds, the invention consists in the novel features hereinafter described in details, illustrated in the accompanying drawings, and more particularly pointed out in the appended claims.

In the drawings,

Fig. 1 is a diagrammatic top plan view illustrating the arrangement of the improved rack car of the transfer relatively to the continuous annealing furnace and the batch furnaces.

Fig. 2 is an end view of the rack car of the transfer, shown with an annealing car supported thereon.

Fig. 3 is a top plan view of the transfer car and its tracks, shown adjacent to one end of the annealing furnace.

Fig. 4 is a vertical sectional view on the line 4—4 of Fig. 3.

Fig. 5 is a transverse sectional view of a detail.

Fig. 6 is a side view of a portion of the rack car.

Fig. 7 is a diagrammatic vertical sectional view illustrating a portion of the furnace, and showing the manner in which the rack car pushes the annealing car into or pulls it out of the furnace.

Referring to the drawings, 7 designates a continuous annealing furnace having lower pairs of rails 8 for the pushing and pulling of rack car 9, and upper pairs of rails 10 for the annealing cars 11, one of which is shown in Fig. 2. The rack car is mounted on a transfer car 12 which can move back and forth on transfer rails 13 which are positioned between the annealing furnace and the batch furnaces or loading yard 14.

The transfer car has a pair of lower rails 15 which support the wheels 16 of the rack car 19 that can not alone shift back and forth on the transfer car, but can move into the annealing furnace on the tracks 8 which are of the same gauge and arranged on the same level as the tracks 15.

The transfer car is also provided with an upper pair of rails 17, the rails of which are of the same gauge and arranged at the same elevation as the tracks 10 of the annealing furnace.

The supporting wheels 18 of the annealing car 11 are designed to travel on the conventional rails in the yard, or batch furnaces, and to then pass on to the tracks 17, and from the latter on to the tracks 10.

For the purpose of shifting the annealing car relatively to the transfer car, it will be noted that the rack car 19 is provided on its under side with a rack 20x which is engaged by pinions 20a fast on shafts 20b carried by the transfer car. These shafts are actuated by suitable gear trains from an electric motor 20c, also carried by the transfer car. Obviously, the rotation of either one of the pinions 20a, when that pinion is meshing with the rack, will cause shifting of the rack car transversely of the transfer rails 13, or in other words, longitudinally of the transfer car 12.

The rack car is provided with a right pair of rocking dogs 20, and a left pair of rocking dogs 21, each set of dogs being journaled on shafts 22 supported by the rack car. Also pivoted on these shafts are counter-weights 23 which, when in lowermost position, bear against the tails 24 of the dogs and hold such tails in contact with stationary stops 25 carried by the rack car.

From Figs. 2 and 7, it may be seen that the annealing car 11 has on its under side near each end, a depending lug or connecting element 26, and obviously, if the rack car is shifted under the annealing car in the yard, the right hand one of the pawls or dogs 20 will be engaged by one of the lugs 26, and will lower to permit such lug to come into engagement with the left hand one of the lugs 20. At such time, the right hand one of the lugs 20, under the force of its counter-weight, will again rise to normal position, and then, if the rack car 19 is shifted to the left, the annealing car 11 can be pulled on to the rails 17. When on those rails, the transfer car 12 can be shifted to the entrance of the annealing furnace, and now, if the rack car 19 is again shifted toward the left, the annealing car can be forced into the furnace, as illustrated in Fig. 7.

Assuming that one or more annealing cars are so situated that dogs 21 can engage lug 26 at the extreme left travel of the rack, then to complete the movement in the opposite direction of the annealing car or cars to the desired position on the transfer car, it may be necessary to disengage the dogs 21 and engage dog 20. Similar operation can be employed in discharging from transfer car.

While the dogs may be automatically engaged with the lugs 26, they can be disengaged by the control of the operator. Consequently, each pair of counter-weights are pivotally connected at 27 to links 28. Each of these links has a slotted inner end 29. Pins 30 project from oppositely extending arms 31 and enter these slots. The arms associated with the right hand dogs are fixed on a shaft 32, and the arms associated with the left hand dogs are fixed on a shaft 33; both shafts being rockably mounted in the body of the rack car.

From Figs. 3, 4 and 6, it may be seen that the shafts 32 and 33 are provided with fixed arms 34 and 35 which are joined by a link 36 in such manner that when either shaft is turned in one direction, the other shaft will be caused to turn in the opposite direction. For the purpose of causing such shifting of the shafts, each of these shafts, as shown in Fig. 6, is provided with an upwardly extending fixed arm 37. Each of these arms is pivotally connected by a link 38 to a bell crank lever 39 that is pivotally supported at 40 and carries a roller or abutment 41.

Both of these rollers cooperate with a channel rail 42 which may be shifted laterally of the transverse truck by means of slidable supporting arms 43 which are pivotally connected at 44 to arms 45 fast on a rock shaft 46 that is journaled in suitable bearings on the transfer car. Such shaft may be rocked by the operator through the instrumentality of a hand wheel 47 which operates a screw mechanism, (not shown), in the pedestal 48 of the transfer car. This screw mechanism in turn raises and lowers a rod 49 that is pivotally connected at 50 to a main arm 51 fast on the rock shaft.

As the channel 42 extends substantially the full length of the rack car 19 but does not move with the same, it will be understood that when either one of the rollers 41 is in engagement with the channel, and the latter is shifted in a direction away from the rack car, this will result in lifting the weights which hold dogs 20 and 21 in their up or engaged position permitting the heavy end of the dogs to fall by gravity when movement of the rack permits the positive lowering of the dogs 20 and 21 and the releasing of the lug 26 of the annealing car from the rack car. The car pusher and transfer, when used in connection with a continuous annealing furnace, operates essentially as follows:—

The car pusher and transfer travels on the tracks 13 which run transversely and adjacent to the front of the furnace 7. As the furnace, transfer car and the loading yard, all have tracks of the same gage to accommodate the annealing cars, it will be evident that the rack car can be used to pull a loaded annealing car from the yard track on to the transfer car tracks 17. The transfer car is then moved in the usual way along its track 13 to the desired one of the furnace entrances, and the rack car 19 is then operated by the motor 20c to push the loaded annealing car or cars into the furnace. On the delivery end of the furnace, a mechanism similar to the transfer car and rack car may be employed to pull the annealing car from the furnace.

The engaging and disengaging of the rack car to the annealing car, as before stated, is accomplished by the dogs 20 or 21 engaging or disengaging the downwardly projecting lugs 26 on the annealing cars.

Each dog and its counter weight rotates on a counter shaft 22, and their relation is such that the counter weight engages the dog and normally maintains it in its highest position, which is established by the lower extremity of the dog making contact with the stop 25. If the counter weight is raised, the dog is so proportioned that it drops to its lowest position. Thus it can be understood that the rack car 19 can be pushed or pulled underneath an annealing car 11, and the foremost dog will depress, allowing the car lug 26 to pass over it and come into engagement with the second or remaining dog of the pair. At this time, the foremost dog returns to its normal position, and at such time, the rack car is connected to the annealing car and is in position to either push or pull the latter. So far, the action of the dogs has been automatic, but to disengage the annealing car from the rack car, it becomes necessary to employ the manual control heretofore mentioned. To be successful this control must be operable while the rack car is at any point of its stroke. This is accomplished by the shiftable channel 42. Thus, it can be seen that the movement of the channel operates the dog lowering mechanism of the rack car at any point of the stroke of the latter.

As the dog lowering mechanism is connected to the counter weights by slotted links 28, it will be understood that the dogs can lower without manual operation, but can also be lowered when necessary by manual control.

Return movement of the channel 42 allows the counter weights, through gravity, to fall, which action restores the dogs 20 and 21 to their highest position. The aforementioned relation of each dog and its counter weight, materializes a condition that when a dog is up, its counter weight is down, and the link 28 connecting the counter weight to the operating lever or arm 31, is in a position so that the slotted portion of the link extends beyond the pin 30 in the operating lever—a condition which allows the counter weight to be raised or lowered by automatic movement of the dog, independently of the manually controlled operating mechanism. It is believed that this arrangement of operating the dogs is flexible enough to take care of any condition that may arise. For instance, suppose that the rack bar 19 has pushed or pulled a car 11, and the contact of the dog to the lug 26 was such that the dog could not fall if its counter weight was raised. With the improved mechanism, all of the counter weights can be raised, and the other dogs will fall, which will allow the rack car to be pushed or pulled until the engaged dog is released, whereupon it will also fall.

From the foregoing it is believed that the construction, operation and advantages of the invention may be readily understood by those skilled in the art, and it is apparent that changes may be made in the details disclosed, without departing from the spirit of the invention, as expressed in the claims.

What is claimed and desired to be secured by Letters Patent is:

1. In combination, a first pair of tracks, transfer tracks arranged transversely thereto, a transfer car movable on said transfer tracks, a second pair of tracks on the transfer car arranged at the same elevation and being of the same gage as the first pair of tracks, an annealing car having supporting wheels adapted to roll on either the first pair of tracks or the second pair of tracks and provided with a connecting element, first rack car tracks extending parallel to said first tracks, second rack car tracks arranged on the transfer car, a rack car mounted on the transfer car and having supporting wheels for traveling either on the first rack car tracks or the second rack car tracks, means for shifting the rack car longitudinally of the transfer car, movable dogs on the rack car adapted to automatically engage the connecting element of the annealing car, and means for positively disengaging said dogs from the connecting element of the annealing car.

2. In combination, a first pair of tracks, transfer tracks arranged transversely thereto, a transfer car movable on said transfer tracks, a second pair of tracks on the transfer car arranged at the same elevation and being of the same gage as the first pair of tracks, an annealing car having supporting wheels adapted to roll on either the first pair of tracks or the second pair of tracks and provided with a connecting element, first rack car tracks extending parallel to said first tracks, second rack car tracks arranged on the transfer car, a rack car mounted on the transfer car and having supporting wheels for traveling either on the first rack car tracks or the second rack rar tracks, means for shifting the rack car longitudinally of the transfer car, movable dogs on the rack car adapted to automatically engage the connecting element of the annealing car, and means for positively disengaging said dogs from the connecting element of the annealing car, said dogs being arranged in pairs and being pivotally mounted on the rack car.

3. In combination, a first pair of tracks, transfer tracks arranged transversely thereto, a transfer car movable on said transfer tracks, a second pair of tracks on the transfer car arranged at the same elevation and being of the same gage as the first pair of tracks, an annealing car having supporting wheels adapted to roll on either the first pair of tracks or the second pair of tracks and provided with a connecting element, first rock car tracks extending parallel to said first tracks, second rack car tracks arranged on the transfer car, a rack car mounted on the transfer car and having supporting wheels for traveling either on the first rack car tracks or the second rack car tracks, means for shifting the rack car longitudinally of the transfer car, movable dogs on the rack car adapted to automatically engage the connecting element of the annealing car, means for positively disengaging said dogs from the connecting element of the annealing car, and counter weight means for normally holding the dogs in a certain position.

4. In combination, a first pair of tracks, transfer tracks arranged transversely thereto, a transfer car movable on said transfer tracks, a second pair of tracks on the transfer car arranged at the same elevation and being of the same gage as the first pair of tracks, an annealing car having supporting wheels adapted to roll on either the first pair of tracks or the second pair of tracks and provided with a connecting element, first rack car tracks extending parallel to said first tracks, second rack car tracks arranged on the transfer car, a rack car mounted on the transfer car and having supporting wheels for traveling either on the first rack car tracks or the second rack car tracks, means for shifting the rack car longitudinally of the transfer car, movable dogs on the rack car adapted to automatically engage the connecting element of the annealing car, means for positively disengaging said dogs from the connecting element of the annealing car, and a counter weight associated with each dog for normally holding the same in a certain position.

5. In combination, a first pair of tracks, transfer tracks arranged transversely thereto, a transfer car movable on said tansfer tracks, a second pair of tracks on the transfer car arranged at the same elevation and being of the same gage as the first pair of tracks, an annealing car having supporting wheels adapted to roll on either the first pair of tracks or the second pair of tracks and provided with a connecting element, first rack car tracks extending parallel to said first tracks, second rack car tracks arranged on the transfer car, a rack car mounted on the transfer car and having supporting wheels for traveling either on the first rack car tracks or the second rack car tracks, means for shifting the rack car longitudinally of the transfer car, movable dogs on the rack car adapted to automatically engage the connecting element of the annealing car, means for positively disengaging said dogs from the connecting element of the annealing car, and counter weights associated with the dogs and movable relatively thereto for normally holding the dogs in elevated position.

6. In combination, a first pair of tracks, transfer tracks arranged transversely thereto, a transfer car movable on said transfer tracks, a second pair of tracks on the transfer car arranged at the same elevation and being of the same gage as the first pair of tracks, an annealing car having supporting wheels adapted to roll on either the first pair of tracks or the second pair of tracks and provided with a connecting element, first rack car tracks extending parallel to said first tracks, second rack car tracks arranged on the transfer car, a rack car mounted on the transfer car and having supporting wheels for traveling either on the first rack car tracks or the second rack car tracks, means for shifting the rack car longitudinally of the transfer car, movable dogs on the rack car adapted to automatically engage the connecting element of the annealing car, means for positively disengaging said dogs from the connecting element of the annealing car, the last mentioned means including counter weights associated with the dogs, a rock shaft having projecting arms, pins on said arms, and links pivotally connected to the counter weights and having slotted portions engaging said pins.

7. In combination, a first pair of tracks, transfer tracks arranged transversely thereto, a transfer car movable on said transfer tracks, a second pair of tracks on the transfer car arranged at the same elevation and being of the same gage as the first pair of tracks, an annealing car having supporting wheels adapted to roll on either the first pair of tracks or the second pair of tracks and provided with a connecting element, first rack car tracks extending parallel to said first tracks, second rack car tracks arranged on the transfer car, a rack car mounted on the transfer car and having supporting wheels for traveling either on the first rack car tracks or the second rack car tracks, means for shifting the rack car longitudinally of the transfer car, movable dogs on the rack car adapted to automatically engage the connecting element of the annealing car, and means for positively disengaging said dogs from the connecting element of the annealing car, said dogs being arranged in pairs, and the last mentioned means functioning to simultaneously actuate the dogs of all pairs.

8. In combination, a first pair of tracks, transfer tracks arranged transversely thereto, a transfer car movable on said transfer tracks, a second pair of tracks on the transfer car arranged at the same elevation and being of the same gage as the first pair of tracks, an annealing car having supporting wheels adapted to roll on either the first pair of tracks or the second pair of tracks and provided with a connecting element, first rack car tracks extending parallel to said first tracks, second rack car tracks arranged on the transfer car, a rack car mounted on the transfer car and having supporting wheels for travelling either on the first rack car tracks or the second rack car tracks, means for shifting the rack car longitudinally of the transfer car, movable dogs on the rack car adapted to automatically engage the connecting element of the annealing car, means for positively disengaging said dogs from the connecting element of the annealing car, the last mentioned means including a rail carried by the transfer car, extending parallel to the rack car and shiftable toward and away from the latter, and abutment means associated with the dogs and shiftable by the last mentioned rail.

9. In mechanism of the class described, a transfer car, a rack car carried by and movable along the transfer car, a pair of dogs pivotally mounted on the rack car, counter weight means for normally holding the dogs in a raised position, and manu-motive means actuated from the transfer car for positively lowering said dogs.

10. In mechanism of the class described, a transfer car, a rack car carried by and movable along the transfer car, a pair of dogs pivotally mounted on the rack car, counter weight means for normally holding the dogs in a raised position, and manu-motive means actuated from the transfer car for positively lowering said dogs, the last mentioned means including a rock shaft on the rack car, arms fixed to and projecting from said shaft, pins carried by the arms, and links pivotally connected to the counter weight means and having slotted portions engaging said pins.

11. In mechanism of the class described, a transfer car, a rack car carried by and movable along the transfer car, a pair of dogs pivotally mounted on the rack car, counter weight means for normally holding the dogs in a raised position, manu-motive means actuated from the transfer car for positively lowering said dogs, and means for limiting the upward movement of said dogs.

12. In mechanism of the class described, a transfer car, a rack car carried by and movable along the transfer car, a pair of dogs pivotally mounted on the rack car, counter weight means for normally holding the dogs in a raised position, manu-motive means actuated from the transfer car for positively lowering said dogs, the last mentioned means including a manually operated channel rail carried by the transfer car and shiftable toward and away from the rack car, and a roller carried by the rack car and engaging said channel rail.

13. In mechanism of the class described, a transfer car, a rack car carried by and movable along the transfer car, a pair of dogs pivotally mounted on the rack car, counter weight means for normally holding the dogs in a raised position, manu-motive means actuated from the cab or operator's platform of the transfer car for positively lowering said dogs, the last mentioned means including a rock shaft having a projecting arm fixed thereto, a bell crank lever, a link pivotally connecting said arm to one of the arms of the bell crank lever, an abutment on the other arm of the bell crank lever, and a member engaging said abutment and shiftable toward and away from said rack car.

14. In mechanism of the class described, a transfer car, a rack car carried by and movable along the transfer car, an annealing car adapted to roll across the transfer car, a lug projecting from the annealing car, dogs movably mounted on the rack car and adapted to automatically engage said lug, and control means for releasing the dogs from said lug.

In testimony whereof, I have signed this specification.

HOMER W. BUCK.